(12) United States Patent
Sen

(10) Patent No.: US 9,477,785 B2
(45) Date of Patent: Oct. 25, 2016

(54) CUSTOMIZED QUERY APPLICATION AND DATA RESULT UPDATING PROCEDURE

(71) Applicant: NutraSpace LLC, Grand Prairie, TX (US)

(72) Inventor: Sandip Sen, Broken Arrow, OK (US)

(73) Assignee: NutraSpace LLC, Grand Prairie, TX (US)

( * ) Notice: Subject to any disclaimer, the term of this patent is extended or adjusted under 35 U.S.C. 154(b) by 186 days.

(21) Appl. No.: 13/917,228

(22) Filed: Jun. 13, 2013

(65) Prior Publication Data

US 2014/0280063 A1 Sep. 18, 2014

Related U.S. Application Data

(60) Provisional application No. 61/792,465, filed on Mar. 15, 2013.

(51) Int. Cl.
*G06F 17/30* (2006.01)

(52) U.S. Cl.
CPC ... *G06F 17/30994* (2013.01); *G06F 17/30696* (2013.01); *G06F 17/30893* (2013.01)

(58) Field of Classification Search
CPC ............. G06F 17/30424; G06F 17/30696; G06F 17/30893; G06F 17/30994
USPC ............................................ 707/722
See application file for complete search history.

(56) References Cited

U.S. PATENT DOCUMENTS

| | | | | |
|---|---|---|---|---|
| 5,819,284 A * | 10/1998 | Farber et al. | ................ | 709/203 |
| 5,951,300 A * | 9/1999 | Brown | ................ | G06Q 10/10 434/236 |
| 6,557,026 B1 * | 4/2003 | Stephens, Jr. | ....... | H04M 3/4938 704/258 |
| 6,615,248 B1 * | 9/2003 | Smith | ......................... | 709/217 |
| 7,039,648 B2 * | 5/2006 | David | ...................... | G06F 8/73 |
| 7,103,642 B1 * | 9/2006 | Chen et al. | ................... | 709/218 |
| 7,734,680 B1 * | 6/2010 | Kurapati | ........... | G06F 17/30035 709/203 |
| 7,930,629 B2 * | 4/2011 | Hurst-Hiller | ..... | G06F 17/30893 709/248 |
| 8,051,057 B2 * | 11/2011 | Abu-Hakima | .... | G06F 17/30864 455/466 |
| 8,301,764 B2 * | 10/2012 | Konig | ............... | G06F 17/30867 707/E17.109 |
| 8,782,071 B1 * | 7/2014 | Mukherjee | ........ | G06F 17/30867 707/759 |
| 9,026,516 B1 * | 5/2015 | Chapin | ............... | G06F 17/3005 707/706 |
| 9,218,392 B1 * | 12/2015 | Zgraggen | .......... | G06F 17/30867 |
| 2001/0037340 A1 * | 11/2001 | Hawkins et al. | .......... | 707/104.1 |
| 2002/0055986 A1 * | 5/2002 | King et al. | ..................... | 709/219 |
| 2002/0087944 A1 * | 7/2002 | David | ....................... | G06F 8/73 717/100 |
| 2002/0152117 A1 * | 10/2002 | Cristofalo et al. | ............... | 705/14 |
| 2003/0020746 A1 * | 1/2003 | Chen et al. | .................... | 345/741 |
| 2003/0093794 A1 * | 5/2003 | Thomas | ............ | G06F 17/30017 725/46 |

(Continued)

FOREIGN PATENT DOCUMENTS

WO    WO 2013085524 A1 *  6/2013  ............. G06Q 30/02

*Primary Examiner* — Phuong Thao Cao

(57) ABSTRACT

Disclosed are an apparatus and method of processing search query results and providing a user interface application to access the query results. According to one example, the application may be configured to perform retrieving user preferences from memory associated with a user profile of a query agent and applying the user preferences to a number of different search queries used to obtain information of one or more topics associated with the user profile. The method may also include automatically executing the search queries to various different remote data sources and receiving a number of search query results to populate user information sources associated with the user profile and included in a user interface.

15 Claims, 12 Drawing Sheets

(56) References Cited

U.S. PATENT DOCUMENTS

| | | | |
|---|---|---|---|
| 2003/0154180 A1* | 8/2003 | Case | G06Q 30/02 |
| 2003/0212579 A1* | 11/2003 | Brown | A61B 5/411 |
| | | | 705/2 |
| 2004/0044548 A1* | 3/2004 | Marshall et al. | 705/2 |
| 2004/0098386 A1* | 5/2004 | Thint | G06Q 30/02 |
| 2004/0203630 A1* | 10/2004 | Wang | H04M 3/42229 |
| | | | 455/414.1 |
| 2005/0102282 A1* | 5/2005 | Linden | G06F 17/3053 |
| 2005/0240608 A1* | 10/2005 | Jones | G06F 17/30324 |
| 2006/0004607 A1* | 1/2006 | Marshall et al. | 705/2 |
| 2007/0043592 A1* | 2/2007 | Eckert et al. | 705/2 |
| 2007/0043709 A1* | 2/2007 | Strassmann | 707/3 |
| 2007/0073654 A1* | 3/2007 | Chow | G06F 19/325 |
| 2007/0174090 A1* | 7/2007 | Friedlander | G06F 19/325 |
| | | | 705/3 |
| 2007/0250643 A1* | 10/2007 | Pyhalammi et al. | 709/245 |
| 2007/0294225 A1* | 12/2007 | Radlinski | G06F 17/30867 |
| 2007/0299986 A1* | 12/2007 | Craig et al. | 709/245 |
| 2008/0010004 A1* | 1/2008 | Small | G08G 5/00 |
| | | | 701/120 |
| 2008/0052668 A1* | 2/2008 | Craig et al. | 717/111 |
| 2008/0126476 A1* | 5/2008 | Nicholas | G06Q 10/10 |
| | | | 709/203 |
| 2008/0183672 A1* | 7/2008 | Canon et al. | 707/3 |
| 2008/0319799 A1* | 12/2008 | Knowlton | G06F 19/322 |
| | | | 705/3 |
| 2009/0083226 A1* | 3/2009 | Kawale | G06F 17/30864 |
| 2009/0150400 A1* | 6/2009 | Abu-Hakima et al. | 707/10 |
| 2009/0193352 A1* | 7/2009 | Bunn | G06F 17/30873 |
| | | | 715/780 |
| 2009/0204905 A1* | 8/2009 | Toghia | 715/753 |
| 2009/0222551 A1* | 9/2009 | Neely | G06Q 30/02 |
| | | | 709/224 |
| 2009/0287657 A1* | 11/2009 | Bennett | 707/3 |
| 2010/0023506 A1* | 1/2010 | Sahni | G06F 17/30876 |
| | | | 707/E17.014 |
| 2010/0094866 A1* | 4/2010 | Cuttner | G06F 17/30035 |
| | | | 707/723 |
| 2010/0100826 A1* | 4/2010 | Hawthorne | G06Q 30/02 |
| | | | 715/745 |
| 2010/0131498 A1* | 5/2010 | Linthicum | G06F 19/322 |
| | | | 707/722 |
| 2010/0145954 A1 | 6/2010 | Barlin et al. | |
| 2010/0161547 A1* | 6/2010 | Carmel et al. | 706/59 |
| 2010/0211863 A1* | 8/2010 | Jones et al. | 715/224 |
| 2010/0293049 A1* | 11/2010 | Maher et al. | 705/14.46 |
| 2010/0293057 A1* | 11/2010 | Haveliwala | G06Q 30/0269 |
| | | | 705/14.66 |
| 2011/0087693 A1* | 4/2011 | Boyce | G06F 19/28 |
| | | | 707/769 |
| 2011/0099066 A1* | 4/2011 | Bilenko | G06Q 30/02 |
| | | | 705/14.52 |
| 2011/0113041 A1* | 5/2011 | Hawthorne | G06F 17/30905 |
| | | | 707/749 |
| 2011/0161419 A1 | 6/2011 | Chunilal | |
| 2011/0191114 A1* | 8/2011 | Bhagwan | G06Q 50/22 |
| | | | 705/2 |
| 2011/0270762 A1* | 11/2011 | Lin | G06Q 20/10 |
| | | | 705/64 |
| 2011/0302117 A1 | 12/2011 | Pinckney et al. | |
| 2011/0320441 A1* | 12/2011 | Lee et al. | 707/723 |
| 2012/0023081 A1* | 1/2012 | Nayak | G06F 17/30867 |
| | | | 707/706 |
| 2012/0066256 A1* | 3/2012 | Ramamurthi | G06F 17/30893 |
| | | | 707/771 |
| 2012/0130813 A1* | 5/2012 | Hicken | G06Q 30/0255 |
| | | | 705/14.54 |
| 2012/0158699 A1* | 6/2012 | Creel | G06F 17/30893 |
| | | | 707/722 |
| 2012/0278312 A1* | 11/2012 | McCoskey et al. | 707/722 |
| 2012/0284105 A1* | 11/2012 | Li | G06Q 30/06 |
| | | | 705/14.23 |
| 2012/0290614 A1* | 11/2012 | Nandakumar et al. | 707/770 |
| 2013/0014151 A1* | 1/2013 | Tallapaneni | H04N 21/25891 |
| | | | 725/23 |
| 2013/0031364 A1* | 1/2013 | Glew et al. | 713/162 |
| 2013/0117038 A1* | 5/2013 | Kusens | 705/2 |
| 2013/0238652 A1* | 9/2013 | Burris | G06F 17/3087 |
| | | | 707/769 |
| 2013/0262230 A1* | 10/2013 | King et al. | 705/14.54 |
| 2013/0325847 A1* | 12/2013 | Suchter et al. | 707/722 |
| 2013/0326406 A1* | 12/2013 | Reiley et al. | 715/810 |
| 2013/0346396 A1* | 12/2013 | Stamm | G06F 17/30867 |
| | | | 707/722 |
| 2014/0019533 A1* | 1/2014 | Sherman | H04L 51/00 |
| | | | 709/204 |
| 2014/0025703 A1* | 1/2014 | Samuels | G06F 17/30424 |
| | | | 707/769 |
| 2014/0046926 A1* | 2/2014 | Walton | G06Q 50/22 |
| | | | 707/710 |
| 2014/0059041 A1* | 2/2014 | Chaudhuri et al. | 707/722 |
| 2014/0101137 A1* | 4/2014 | Satyanarayanan | H04L 67/306 |
| | | | 707/722 |
| 2014/0108370 A1* | 4/2014 | Andri | G06F 17/30749 |
| | | | 707/706 |
| 2014/0123001 A1* | 5/2014 | M. et al. | 715/251 |
| 2014/0250043 A1* | 9/2014 | Malinsky | G06N 5/02 |
| | | | 706/46 |
| 2014/0258219 A1* | 9/2014 | Raichelgauz et al. | 707/609 |
| 2014/0280063 A1* | 9/2014 | Sen | G06F 17/30994 |
| | | | 707/722 |
| 2014/0280575 A1* | 9/2014 | Cowan | 709/204 |
| 2014/0282098 A1* | 9/2014 | McConnell | 715/753 |

* cited by examiner

CUSTOMIZED QUERY APPLICATION AND DATA RESULT UPDATING PROCEDURE

CROSS REFERENCE TO RELATED APPLICATIONS

This application claims the benefit of prior filed U.S. Provisional Application Ser. No. 61/792,465, filed on Mar. 15, 2013, entitled CUSTOMIZED QUERY APPLICATION AND DATA RESULT UPDATING PROCEDURE, incorporated herein by reference.

TECHNICAL FIELD OF THE APPLICATION

This application relates to a method and apparatus of performing queries and automatically populating user profile based applications and corresponding information sources.

BACKGROUND OF THE APPLICATION

Conventionally, search engines require instant input to provide instant feedback regarding Internet websites, sponsored links, images, audio, video, etc. In a general use case, a user would submit a query to a search engine (i.e., remote server) and receive results based on the more relevant sources of information as identified by the search engine.

SUMMARY OF THE APPLICATION

One embodiment of the present application may include a method of retrieving user preferences from memory associated with a user profile of a query agent and applying the user preferences to a plurality of different search queries used to obtain information of at least one topic associated with the user profile. The method may also include automatically executing the plurality of search queries to a plurality of remote data sources, and receiving a plurality of search query results and populating user information sources associated with the user profile.

Another example embodiment of the present application may include an apparatus that includes a memory configured to store a user profile comprising a plurality of user preferences accessible via a query agent. The apparatus may also include a processor configured to retrieve user preferences from the memory associated with the user profile of the query agent, apply the user preferences to a plurality of different search queries used to obtain information of at least one topic associated with the user profile, automatically execute the plurality of search queries to a plurality of remote data sources, and a receiver configured to receive a plurality of search query results and populate user information sources associated with the user profile.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, a packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

A user of an online search engine may be seeking information for a number of different purposes. For example purposes, the example embodiments have been described as pertaining to a health care search engine, platform, profile, etc. However, it is important to note that any subjective content may be the basis for the application and infrastructure described in the present application. A prosumer is defined as a producer and/or consumer of information.

Figure 1:
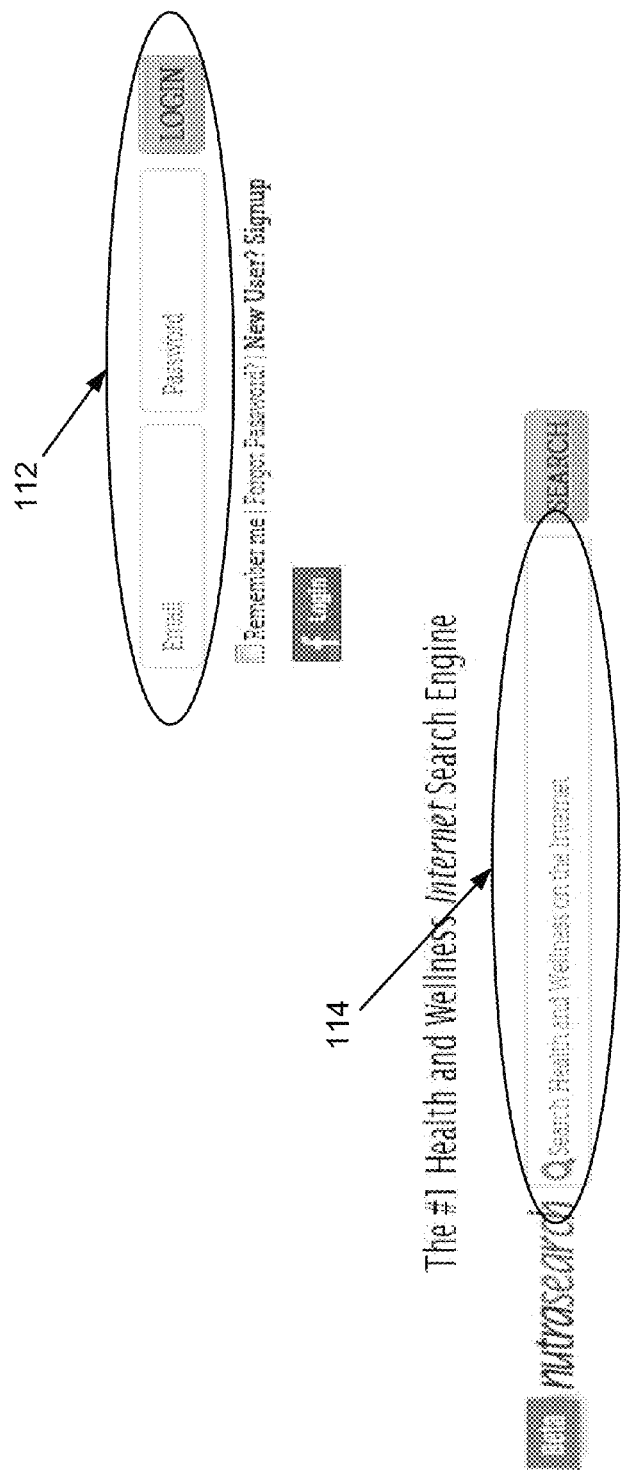
FIG. 1 illustrates an example login or access user interface application according to example embodiments of the present application.

FIG. 1 illustrates an example login or access user interface application according to example embodiments of the present application. Referring to FIG. 1, the user query engine specified for a particular subject, such as health and wellness may be provided to a user based on the user's profile. The user may login to the online website or web-based application via a login interface 112. The user may setup a profile and enter certain information, such as demographic information (e.g., age, sex, marital status, income, living location, ethnicity, etc.), and other information such as those related to the topic of the web application. In this example, the topic may be health and wellness. The user may access the query engine 112 and perform queries of the Internet via query interface 114 which rely on the user's profile information to generate the results. For example, the user may have interest in certain chronic health care conditions related to the stomach (e.g., Crone's disease, acid reflux, GERD, etc.), and may have a preference for herbal non-drug remedies, organic foods, may be over 50 years old and may live in the New York area. The user may obtain results for a particular healthy recipe based on the query for "healthy dinners". However, the results may be tailored towards people with chronic stomach pain or related problems, based on organic ingredients and may suggest grocery locations or related outlets in the user's general home area.

Figure 2:
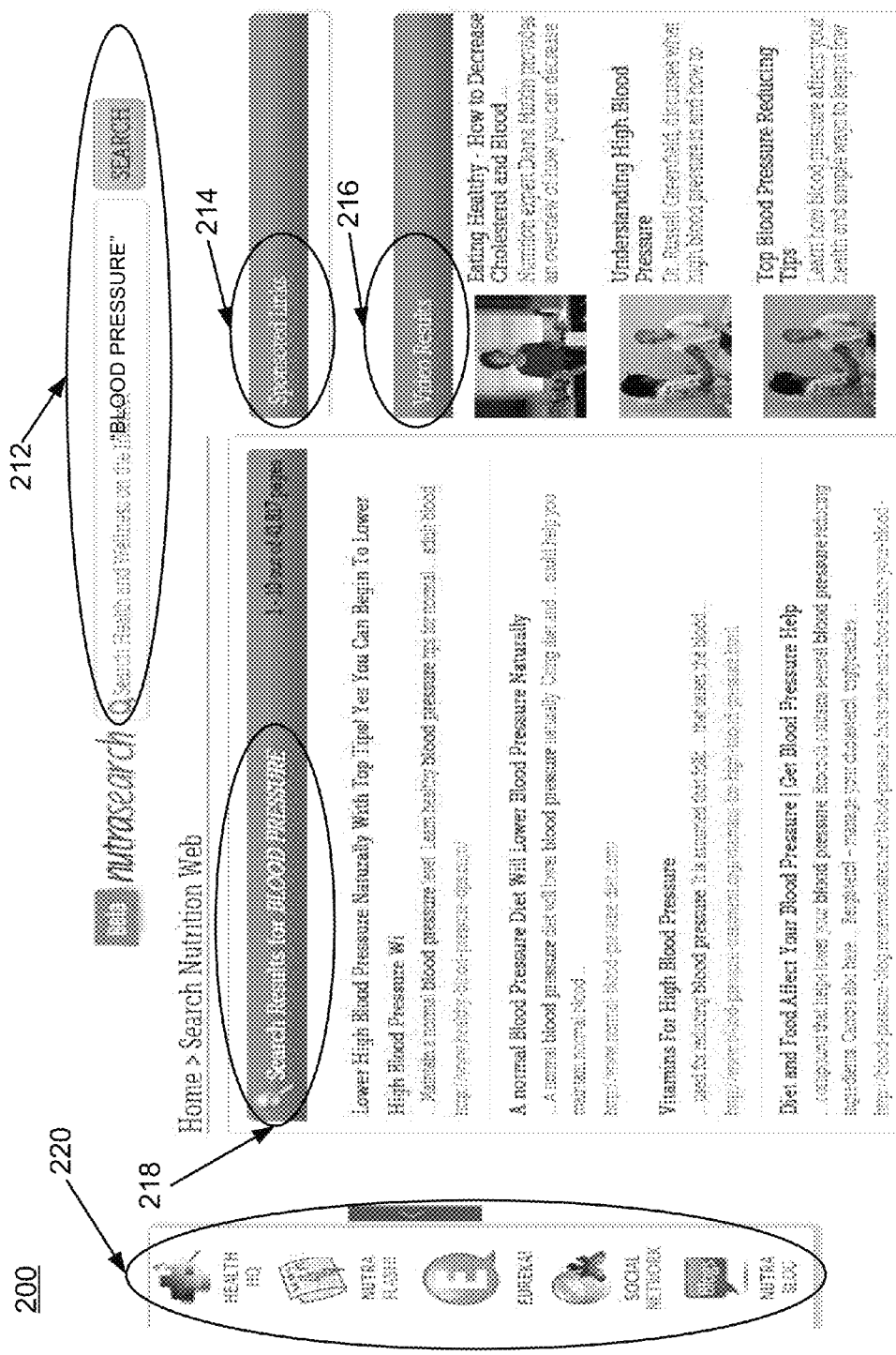
FIG. 2 illustrates an example query result page generated according to user specified search requirements according to example embodiments of the present application.

FIG. 2 illustrates an example query result page generated according to user specified search requirements according to example embodiments of the present application. Referring to FIG. 2, the user has submitted a query for 'blood pressure', which returned results directed to blood pressure information. In FIG. 2, the user interface 200 returned query results with a query interface 212, a main display area 218 including hyperlinks to uniform resource locators (URLs), a sponsored links section 214, a video results section 216 and a toolbar with a list of functions that each lead to additional information portals, sources, auto-populated data fields, etc., described in additional detail in FIGS. 3A-3F.

Figure 3A:
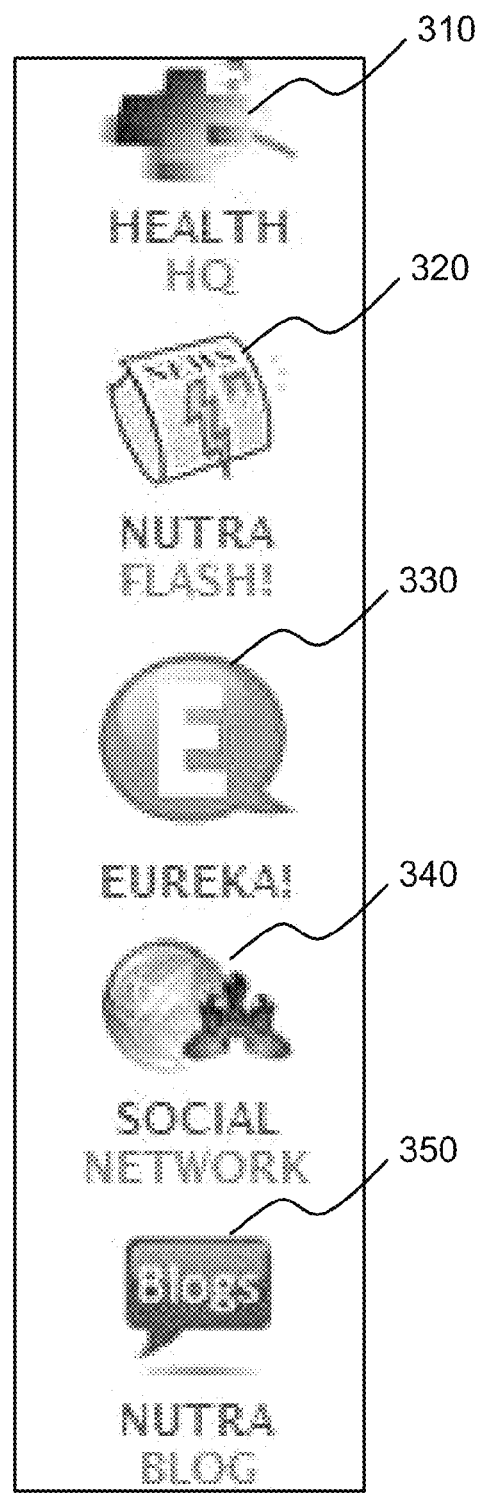
FIG. 3A illustrates an example toolbar of the various functions provided by the website application according to example embodiments of the present application.
Figure 3B:
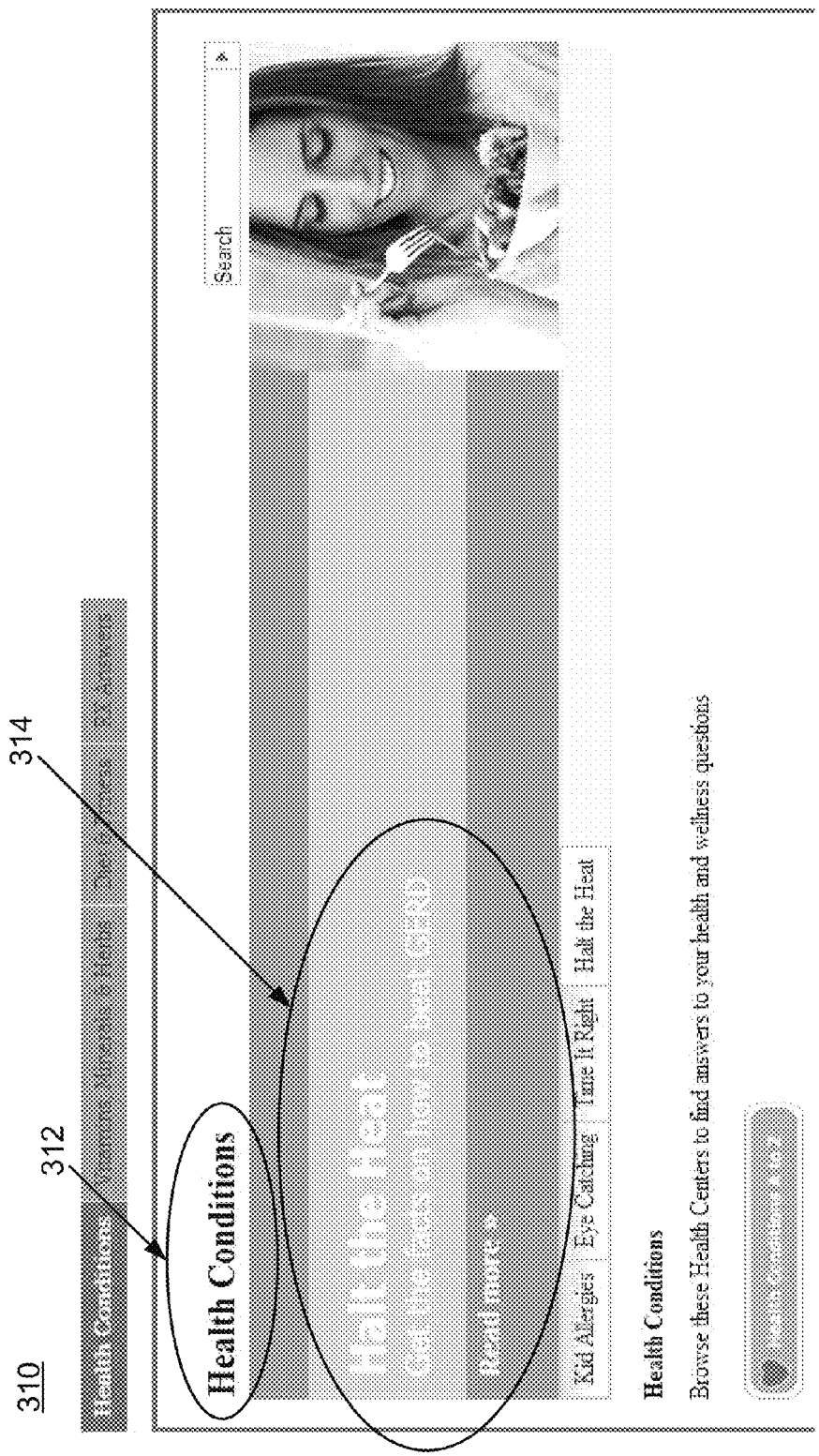
FIG. 3B illustrates an example display window of the various content generated by the health HQ function of FIG. 3A, according to example embodiments of the present application.

FIG. 3A illustrates an example toolbar of the various functions provided by the website application according to example embodiments of the present application. Referring to FIG. 3A, the toolbar of user functions include a variety of options to realize the health related data from various different displays and setup options. For example, the health headquarters (HQ) 310 provides a shortcut to a data source interface regarding a particular user health condition. For example, the user may have a priority identifier or tag that is used as the basis for their health HQ 310 information source. In this example, the user has a predefined condition 'GERD' or Gastroesophageal reflux disease. The user may have this condition as his or her primary focus for the health HQ function 310.

The health HQ function 310 may instead create a primary health concern based on previous queries or information retrieval performed under the user's profile. For example, the user may have performed more searches for GERD or "Acid reflux" than any other health condition identified via a condition identification library used to match against the parsed words from the query string. As a result, over the course of one day, a week, a month, etc., the primary condition may have been automatically established and may also be updated periodically to different conditions depending on the user's previously submitted queries. The user interface 310 of FIG. 3B may include a daily article or news feed received from a reputable data source, website, RSS feed, etc. The health conditions tab 312 may identify the topic of interest and the main display area may have the content 314 presented to the user seamlessly as the article, source, video, image, snippet of information, etc., of the day. Also, other primary health condition information may be presented to the user based on a revolving round robin system that changes each time the user access the health HQ 310.

Figure 3C:
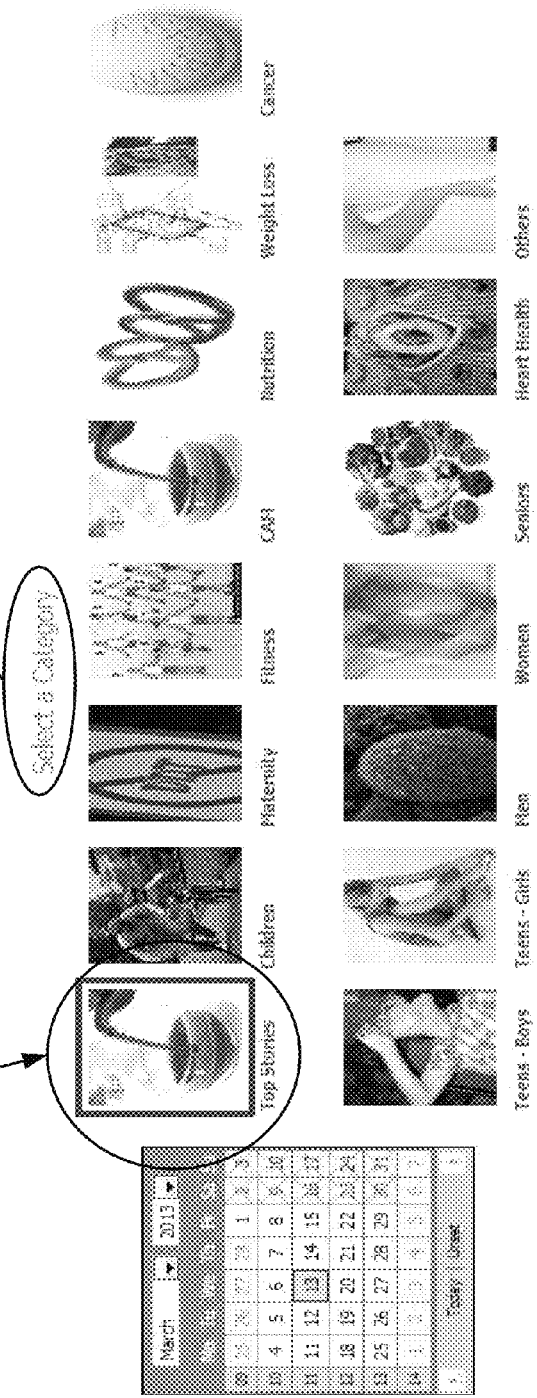
FIG. 3C illustrates an example display window of the various content generated by the news function of FIG. 3A, according to example embodiments of the present application.
Figure 3D:
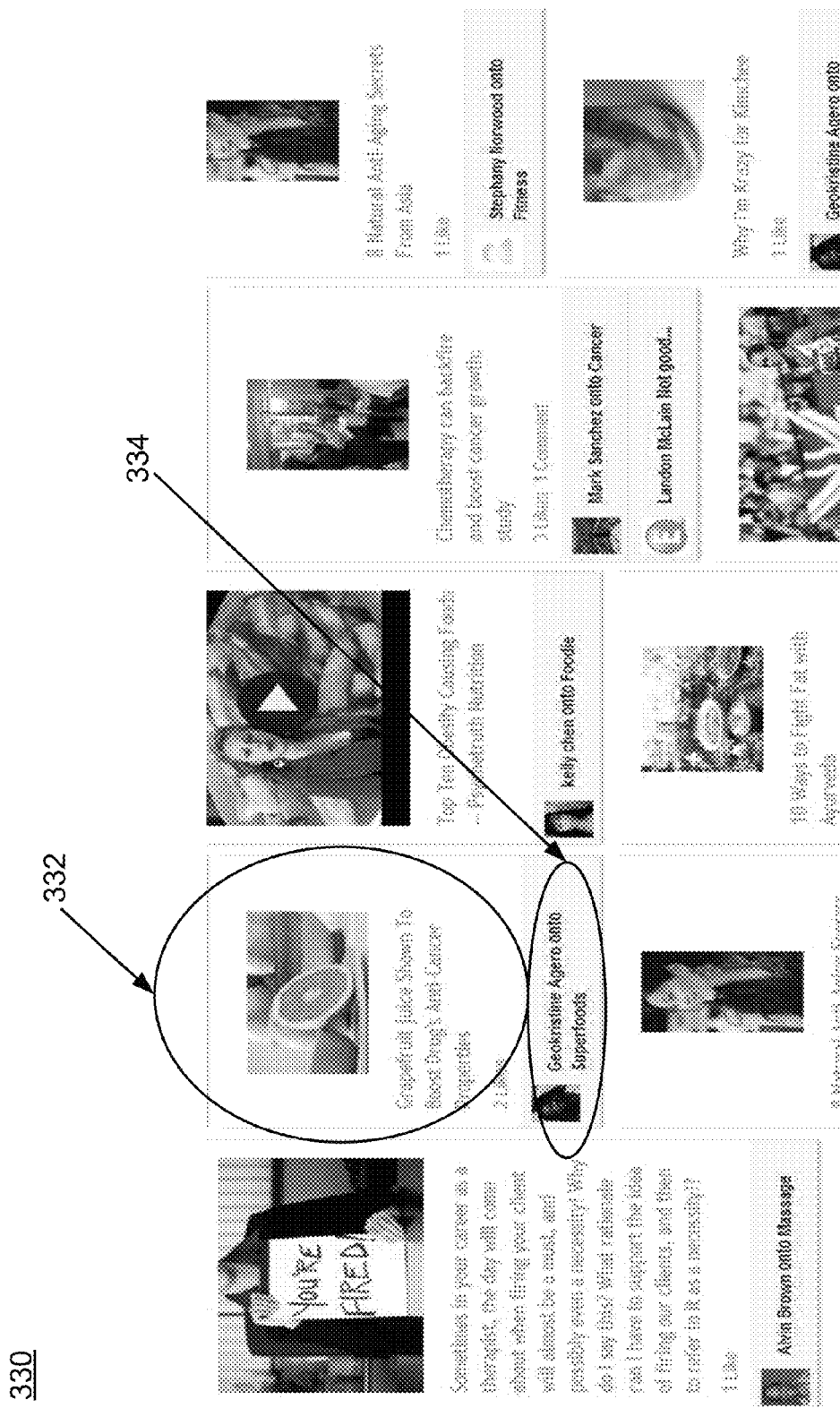
FIG. 3D illustrates an example display window of the various content generated by Eureka function of FIG. 3A, according to example embodiments of the present application.

The second function of FIG. 3A is the news flash icon 320. This example may provide a user with access to a list of health care articles across a large number of topic areas. Each of the areas of interest may be populated with new information for the particular day. In FIG. 3C, the display interface 320 includes a large variety of topics. The first topic 'top stories' 322 may be the first of many different topic areas which has been linked to a recent article or news feed in the particular topic area. The topics or categories 324 may be arranged in descending order based on the user's personal information and a preference prediction method performed by the health agent application. For example, the user may have a known query term "children" or "maternity" which makes the topics be presented to the user first in the order of those particular categories. Alternatively, the user's profile information may be used as the basis for the topic order. For example, a woman or man whose age is 50 would by default receive health updates about osteoporosis, colon health, or muscular degeneration as opposed to reproductive wellness information for a woman or man who is aged 30.

The next topic area in the function topics of FIG. 3A is the Eureka 330 category. This example includes various topics posted by users in the social network of the user or those paired to the user with similar interests, queries, or demographics. For example, users who frequently search for GERD or another topic related to the present user's queries may have interests posted on their profiles or personal blogs to which they are subscribed. Those users who match submitted query characteristics of the present user, either through direct matches or correlations (related issues), may be matched in the Eureka function to have their information of interest shared along with their topic or names to assist with the user's navigation of such categories. For example, a user concerned about "GERD" may correlate with articles or feeds that were tagged by other users who are interested in the same health condition. As a result, the likelihood of finding useful information on the Eureka postings is much higher than a random configuration of articles.

Figure 3E:
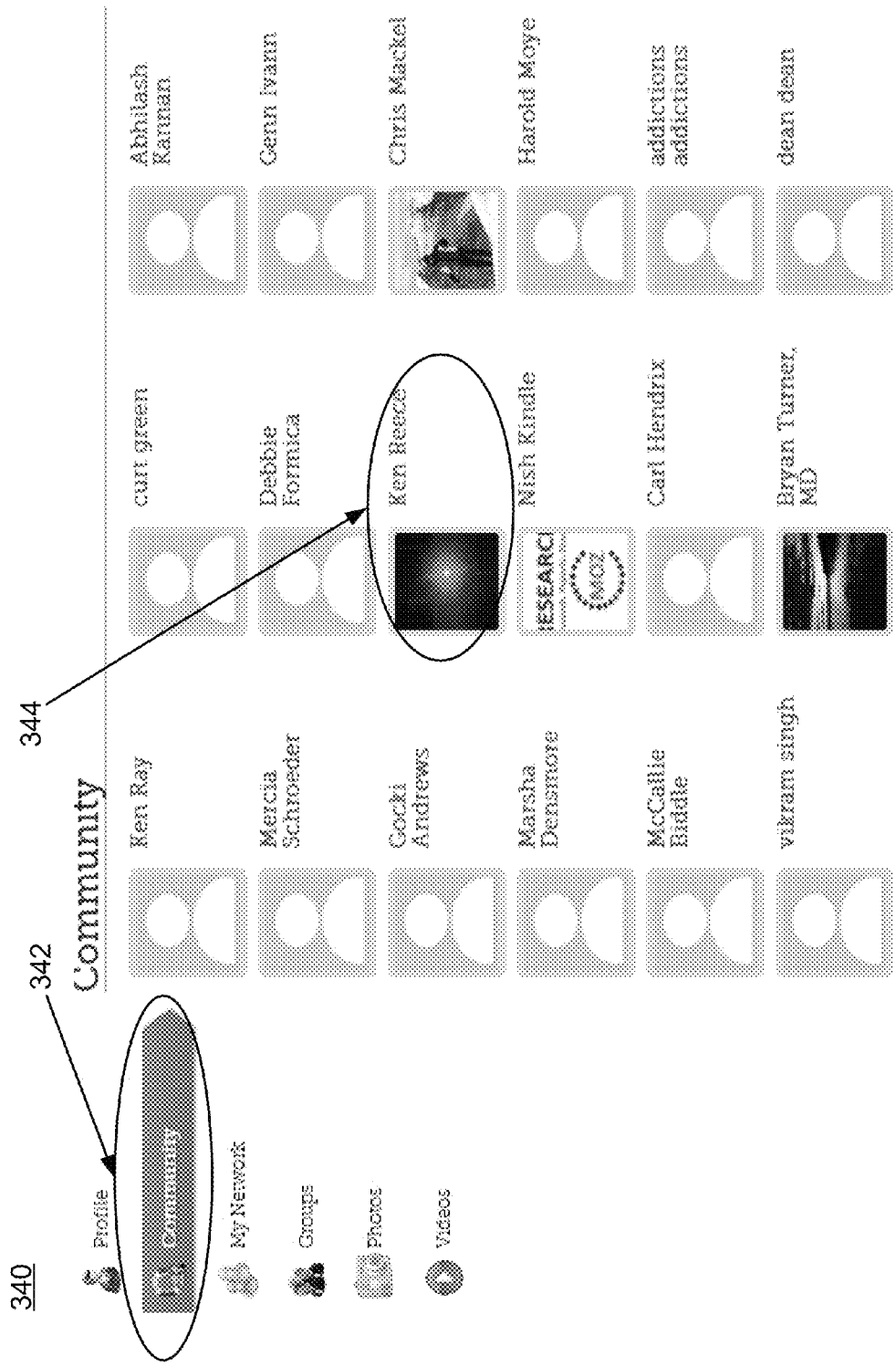
FIG. 3E illustrates an example display window of the various content generated by the social network function of FIG. 3A, according to example embodiments of the present application.
Figure 3F:
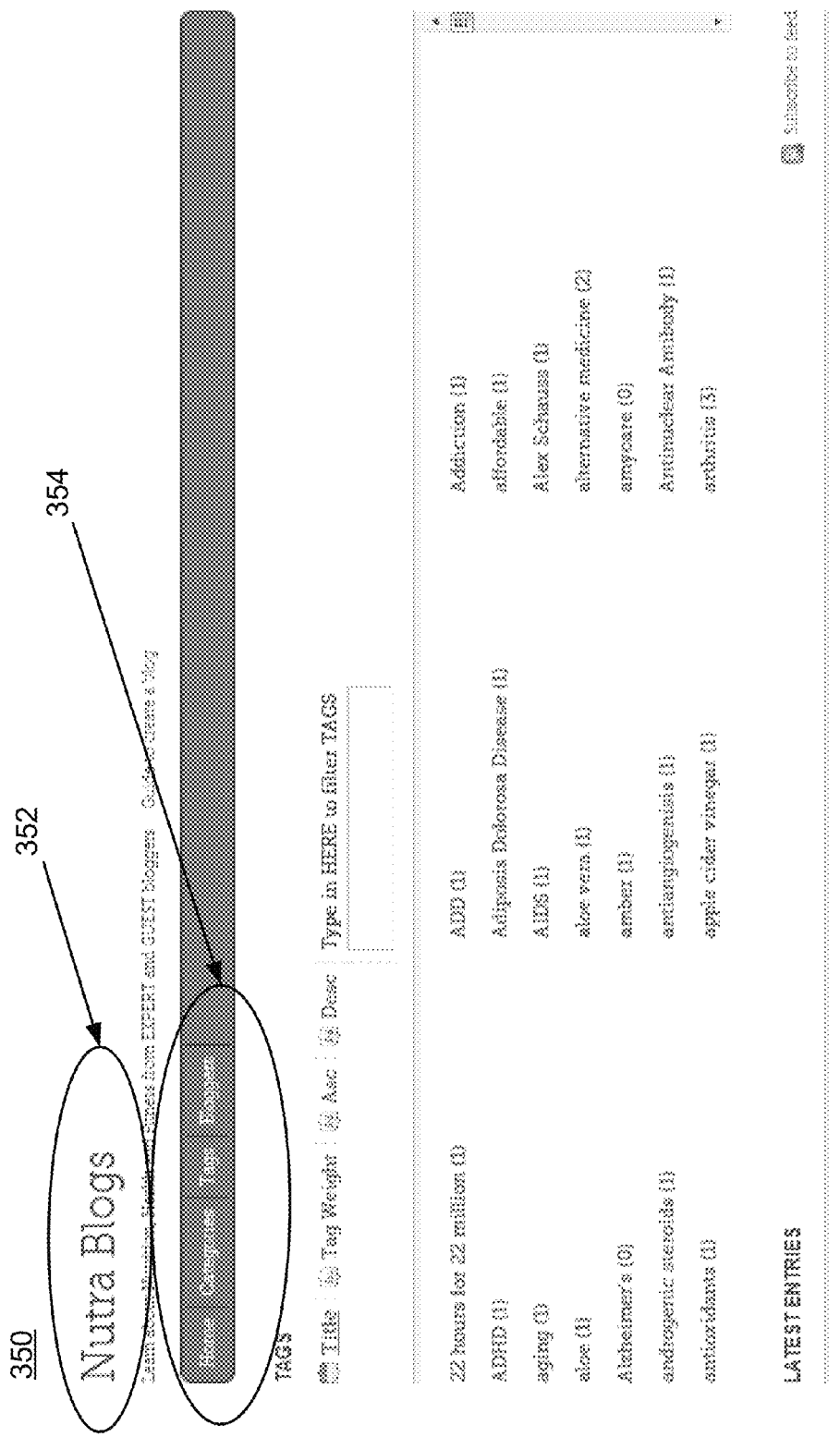
FIG. 3F illustrates an example display window of the various content generated by the blog function of FIG. 3A, according to example embodiments of the present application.

Referring again to FIG. 3A, the next function of FIG. 3A is the social network 340. In FIG. 3E the social network interface 340 may be based on the queries, topics, search terms, profile information or user preference of the user. The users 244 may be part of a specific community 342. According to one example, the user may have a community of users who are all sharing a common condition "GERD" so the user may peruse the entries and users who are linked to that condition and the posts that are directed to that topic. For example, the community may be automatically filtered to include users who have the same condition or are interested in the condition, and all the posts directed to that condition so the subject matter is relatively focused and easy for the user to navigate when seeking precise content related to "GERD".

The last function in FIG. 3A, is the blog 350. In operation the blog may be a topic of interest "GERD" and the user may be able to view all the blogs in the community related to that condition in one interface 350 of FIG. 3F. The blogs 352 may have distinct categories 354. The user may have been already registered with the blog due to their parsed or submitted interests. In other words, the user's activities identified from queries, reading articles, communicating with others, etc., may have earned him or her as subscription to a particular blog without any further action.

It is important to note that the timeliness, relevancy, specificity, usability, and appropriateness of the information provided to a prosumer is used for serving his or her needs. Any and all available information about the prosumer, both explicitly articulated and inferred from user activities, including but not limited to browsing, reading, clicking, selecting, sharing, querying, commenting, linking, saving, assimilating, uploading, creating knowledge, can be used to deliver personalized, adapted, and targeted content to the prosumer.

A search agent or processing platform has been described as a health prosumer (HP) agent. A health agent architecture may have various modules, engines, processors, databases, servers, etc., each of which contributes to the success of the search functions performed by the present application. The role of each module in the health prosumer (HP) agent, also referred to as HPA, their architecture and interactions with each other (e.g., information forwarding, retrieval, data collections, etc.) are illustrated in the example logic diagram of FIG. 4.

Figure 4:
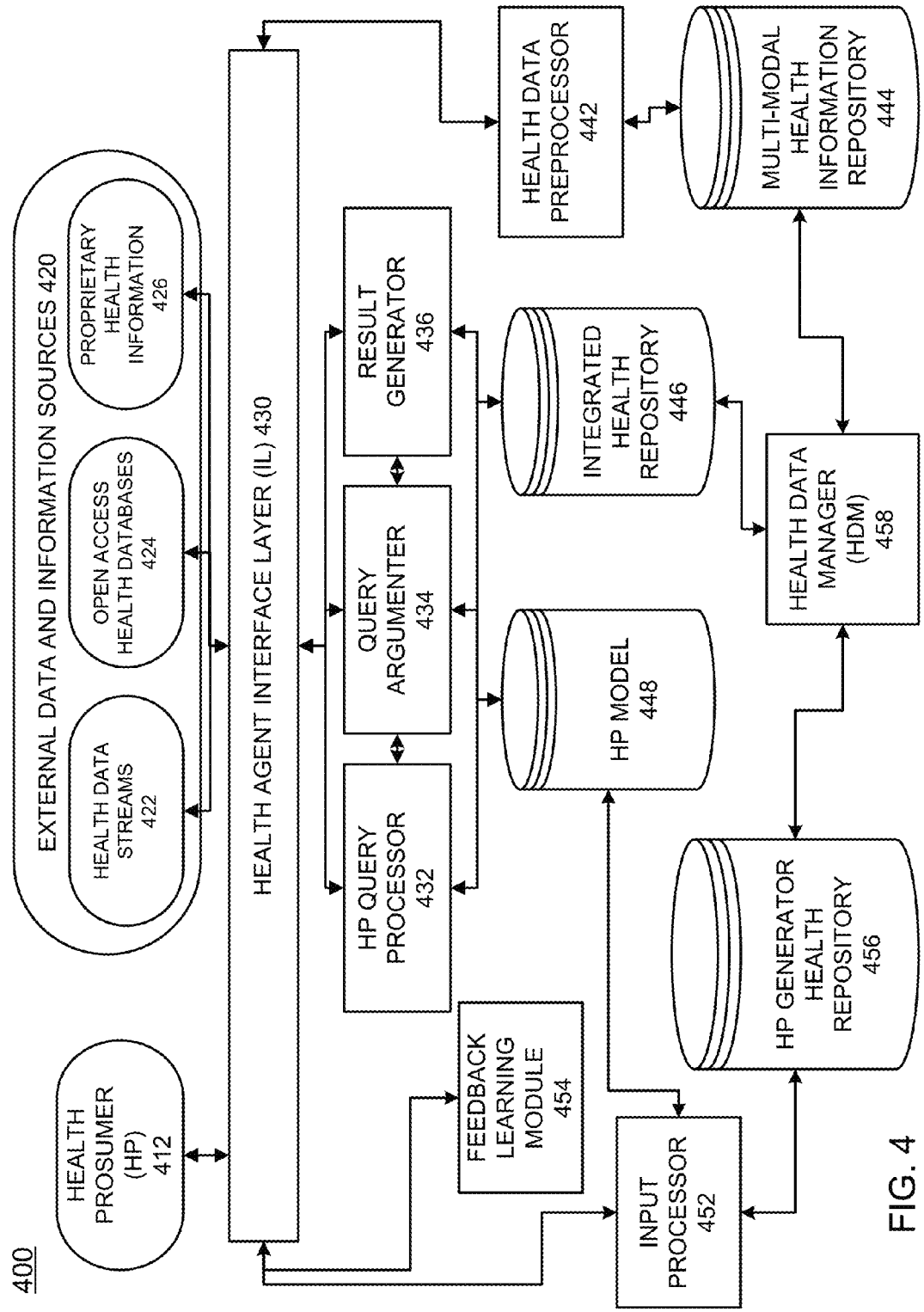
FIG. 4 illustrates an example query engine health agent logic diagram according to example embodiments of the present application.

Referring to FIG. 4, it is important to note that each of the modules may be part of the same computing platform or may be part of different computing platforms depending on the customized application configuration. The health prosumer agent architecture (HPA) 400 is illustrated in FIG. 4. The health agent interface layer (IL) 430 is a centralized module configured to receive information from the users, health prosumers, as well as different kinds of information and data sources (e.g., third party data sources, social media accounts, RSS feeds, blogs, etc.). This may include online streams of health data (e.g., news feeds, social media updates, etc.).

The open access health databases 424, and proprietary health information sources 426 each represent data and information sources that may require tailored interaction protocols and processing. This module also returns results generated by the result generator (RG) 436 and access requests to external data and information sources including the health data streams (HDS) 422, open access health databases (OAHD) 424, and proprietary health information sources (PHIS) 426 by the HPA.

The HPA input processor (IP) 452 takes information and stores it in memory (e.g., HP generator health repository 456). The information may be shared by HPs 412, which includes user preference information (e.g., specified conditions, interests, personal demographic profile information, etc.), personal anecdotes (user posts), experiences, health tips, etc. to be shared with other users in their social network established by the profile information. The input processor module 452 updates both the HP generated health repository (HPGHR) 456 and the HP model (HPM) data repository 448. Examples of specified conditions may include health conditions of interest, Crohn's disease, high blood pressure, COPD, etc.

The HP feedback learning module 454 (F/LM) may use user ratings and comments on the results provided by HPA to fine-tune the HPM. The query processor 432 (QP) accepts health queries from the HPs and translates them into an easy-to-process canonical form, and forwards them to the query augmenter (QA) module 434, which receives HP queries in a standardized form and augments them by adding unspecified details and previously identified user preferences retrieved from a user profile including user information posts, user preferences, user demographic information, user health concerns, conditions, etc. the user information may be provided by consulting the health prosumer model (HPM) 448 which stores such information.

The result generator (RG) 436 receives augmented HP queries and consults the user model 448 and the integrated health repository (IHR) 446 to produce results tailored to user needs and presented in a manner optimized to the user preferences. The health data manager (HDM) 458 combines the HP generator health repository data 456 produced by the HPs and the multimodal health information repository (MHIR) 446 produced by the HDP module from external data and information sources to produce the IHR data 446. The HPA health data preprocessor (HDP) 442 proactively identifies health information of possible interest to various HPs from various external data and information sources, including HDSs 422, OAHDs 424, and PHISs 426 and continually enhances the multi-modal health information repository (MHIR) 444.

One example embodiment may provide an example where the user or prosumer is sharing information with the data access functions accessed via the online site and according to their personal profile. A HP can submit information about any of the following personal experiences related to personal health, and which will be assimilated into the health repository (HPGHR) 456 and which can be proactively shared with or reactively provided in response to a query from another user, such as a health treatment that has worked for a particular medical condition, an information source that has been particularly informative, a health related support group that has been a source of knowledge/support/social networking, personal experiences of interacting with health service providers and facilities, (e.g., "Dr. 'X' was very empathetic and took time to understand and assuage my concerns", "The after-hours facility 'Y' is understaffed and also seems to be ill-equipped to handle medical situations like 'Z'.", etc.

The IP module 452 processes the inputted information and updates the HPGHR 456, which can in turn trigger the HDM 458 to update the IHR 446. As a result, the RG module 436 can proactively access the information, generate recommendations, autopopulate user adopted functions (e.g., user's links, user's blogs of interest, user's products of interest, user's personal favorites, user's videos, user's articles, etc.), recommend to other users, etc., in the social network of the source HP, based on their interests stored in the corresponding agent HP model, some of which is newly added information. As a user logs back into their account, they will find new results pertaining to their interests similar to new emails or messages on a social networking site.

The HP/user can also provide input of the following types about his/her personal preferences, interests, and opinions which can be used to update the HPM 448. For example, "I value information provided by the blog XYZ", "I found the summary conclusions from the paper that was recommended in response to my query on treatment PQR for illness A", "I prefer video demonstrations of massage techniques than reading textual descriptions", etc. Such inputted information causes the FLM 454 module to update the HPM. Such updates to the HPM 448 may either trigger immediate generation of proactive recommendations by the RG 436 from existing IHR 446, e.g., the user may be shown a link about a certain medical condition recently published in an information source that the user now likes, and will also affect future proactive and reactive results generated by the health agent for this particular user.

According to another example embodiment, an HP query may be performed to include any of the types of information other HPs may have shared. For example, the queries may be at different levels of granularity/details, e.g., geographical, expertise areas. Queries may also be contextualized by adding personal information, such as an inquiry "Can you recommend doctors for retired patients of Mexican origin with limited English skills suffering from diabetes and digestive ailments?"

In one example, the application uses natural language processing (NLP) techniques to parse queries into actionable components. For example, first the primary entity to be recommended, "doctors" in this case, will be identified. Following this, qualifiers for the primary entity will be recursively parsed. Recursive language processing mechanisms are well-understood but will be adapted for the HealthAgent application with specific vocabulary based on a health ontology that can identify medical conditions, treatments, supplements, organizations, etc. While such domain knowledge augmented NLP techniques will not be full proof, they can be used with a high degree of efficacy to process most user queries from typical HPs.

Natural language processing (NLP) operations may be performed to parse the content and/or the results of the submitted queries into actionable components. For example, the primary entity to be recommended, in this case 'doctors', will be identified by natural language processing. Following this approach, qualifiers for the primary entity will be recursively parsed. Recursive language processing will be configured for the Health Agent application with specific vocabulary (i.e., library of terms, correspondence and term relationships, etc.) based on a health ontology that can identify medical conditions, treatments, supplements, organizations, etc. While such domain knowledge augmented NLP techniques will not produce flawless results, they can be used with a high degree of efficiency to process most user queries from typical HPs.

In another example, updates from external data and information sources may include a periodically recurring process. In general, the health agent is a virtual or digital function that is living or continually performing actions to assist the user and provide relevant data. It may be considered a persistent entity that continually monitors external sources to update and upgrade its knowledge about health research, findings, conditions, trends, interests, products, etc. to keep abreast of latest development in the research and practice of the medical sciences and health industry. As it queries and receives medical information from the various sources (e.g., HDS 422, OAHD 424, PHIS 426), the harnessed and processed information is assimilated into the MHIR 444. These updates to the MHIR 444 can trigger the HDM 458 to update the IHR 446, which in turn can cause the RG 436 to produce enhanced results to future queries and even produce immediate proactive recommendations, e.g., a new health supplement for a particular health condition may be prescribed, a new support group for people with a certain disability that has been formed in a particular HP's town which may be recommended, etc.

In operation, the health agent of FIG. 4 provides information that is knowledgeable, informed, caring, and understanding similar to a health care provider or friend/acquaintance/well-wisher/family member would provide for a loved one. Once the user's/prosumer's interests, needs, conditions, preferences, are known, the agent works continuously and opportunistically to identify new information relevant to the user's profile.

The information received by the user may be accurate and reliable information from established medical sources. In addition, the health agent also permits users to connect with others with overlapping medical interests and share personal experiences, references, opinions, recommendations, etc. The adaptive, personalized, and proactive agent uses both explicit user requirements, such as user specifications, ratings, etc. and implicit user feedback information, for example, recommendations used/not used by users to tailor the recommendations to the user. So as a particular user's interest's change or as new information becomes available from other users or from external sources, the type, quantity, and specifics of the results generated for that user change dynamically to meet new requirements and interests.

According to example embodiments, for a new user, with a specified profile, the sources of information and the level of detail provided will be based on the content presented to similar users. For example, a middle-aged man (35-50) with an advanced degree and interested in GERD may be provided with a ranked list of sources where scholarly articles are presented before blog links or popular news articles. If the user repeatedly chooses links lower down in the list, such as, blog posts, the agent will identify the selections as implicit feedback, i.e., ignoring scholarly articles, to reduce their importance for this user. Repeated instances (e.g., 2 or more times) may create an iterative process that identifies a threshold of instances ($T_{implicit}$) and takes action accordingly once the threshold is reached. This implicit user identification process may be performed in addition to explicit feedback, both of selection(s) of blog posts, as well as ratings for them, if provided, to move the blog posts of the kind preferred by the user further up in the ranked order for future recommendations/query results.

The devices operated by the user or used to generate a health agent result may be any or more of a computer, laptop, mobile, wireless or cellular phone, a PDA, a tablet, a client a server or any device that contains a processor and/or memory, whether that processor or memory performs a function related to an embodiment of the application.

Figure 5:
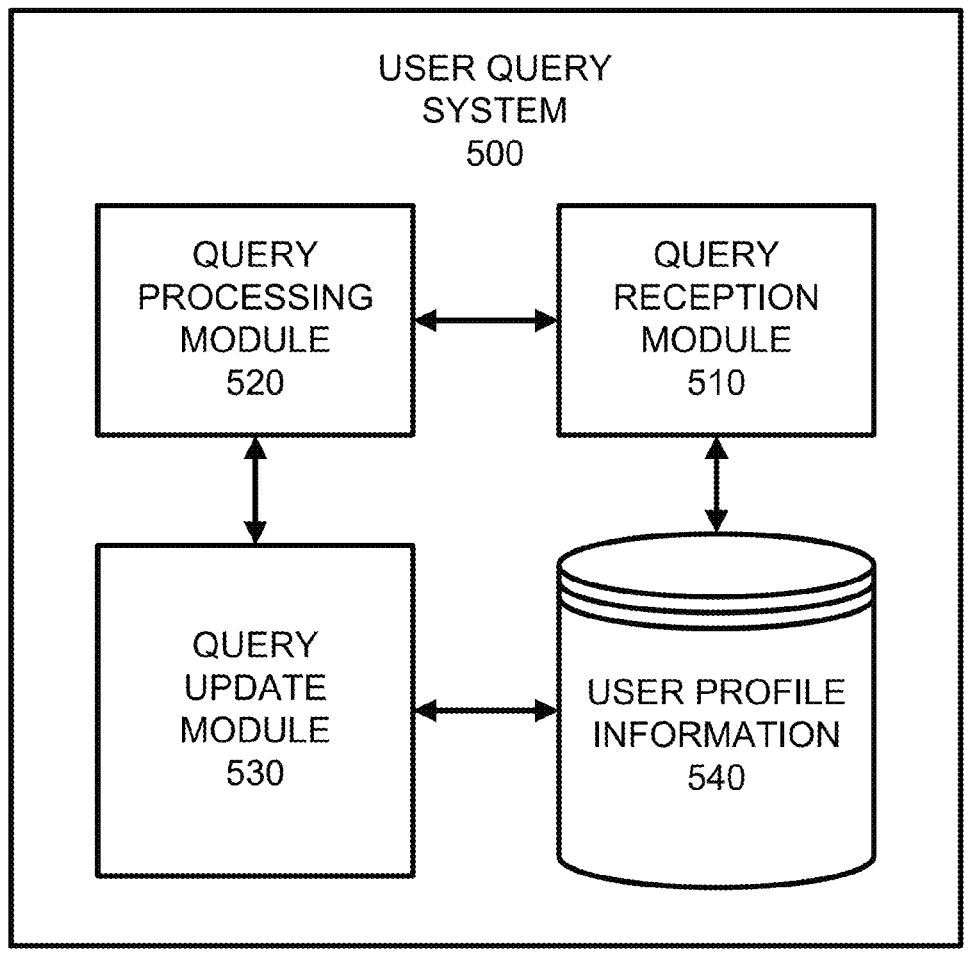
FIG. 5 illustrates a system configuration that is configured to perform one or more operations corresponding to the example embodiments.

FIG. 5 illustrates an example system configuration of a user query system 500. In one example method of operation the device or devices of the query system 500 may perform retrieving user preferences from memory 540 associated with a user profile of a query agent via a query reception module 510. The method may also include applying the user preferences to a number of different search queries used to obtain information of at least one topic associated with the user profile. For example, the query reception module 510 may receive a query for a particular health care topic and may access the user profile 540 to identify the user's health conditions of interest, personal age, income, education, living area, etc., and even past queries, link selections, video selections, online community or social networking affiliations and posts, etc., all of which may be applied to the result generation procedure. The method may also include automatically executing the search queries to a number of remote data sources on the Internet via query processing module 520. The method may then provide receiving a number of search query results and populating user information sources associated with the user profile via the query update module 530.

In additional examples and procedures, the searching may be periodically re-executed and the results may be automatically re-populated into the user information sources, such as a custom dashboard user interface layout as illustrated in FIG. 2. The user may have a predefined user interface that is populated with information from sources specified by the user or directed to various different content types. For example, the information processing may also include retrieving uniform resource locator (URL) links to relevant web pages based on the user profile and populating a first window of the user interface with the URL links. In this example, the search results may be links to websites with relevant subject matter, however, the results may be based on search terms not just from the user query but also based on the user's profile, concerns, previous queries, etc. In addition, videos links may be retrieved that point to various video sources based on the user profile, and a second window of the user interface may be populated and repopulated with the video links. Also, customized user content may be identified in the user profile and used to populate a third window with the customized user content that includes at least one of an interactive user blog that the user frequents or has a preference or established account, a publication audit filter that is updated when new publications become accessible at a predefined publication source via online content access, for example, a user may have a setting to receive any NIH publications or DOH publications or MIT publications related the user's health conditions of interest established in their profile or previous queries. Another example would be a specific URL audit filter that is updated when new content at the specific URL becomes accessible via online content access, such as particular website of interest (e.g. national institute of health (NIH), department of health (DOH) websites, national cancer association (NCA), etc.).

Other example operations tied to the query processing may include updating the user profile to include at least one additional user search preference based on previously submitted search queries submitted while logged into the user profile, parsing the previously submitted search queries to identify search terms related to health conditions and automatically executing the search queries to the remote data sources based on the identified search terms. If the user is known to frequent blogs, social networking or other similar information sources then the user may be automatically subscribed via his or her user profile to at least one of an online news feed and a blog related to the subject content of the identified search terms. The user profile may include user information posts to online data sources, user preferences, user demographic information, user health concerns, user health conditions. The search querying may also perform pairing the user demographic information with demographic information of another user profile and linking the user profile of the first user with the user profile of the second or additional users and modifying subsequent query results provided to the user to include content associated with the queries, blog posts, and user profile related information of another user. This provides a way to link people together with similar interests, concerns and who are willing to share and have information shared with others.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 102 and 103, etc.

Figure 6:
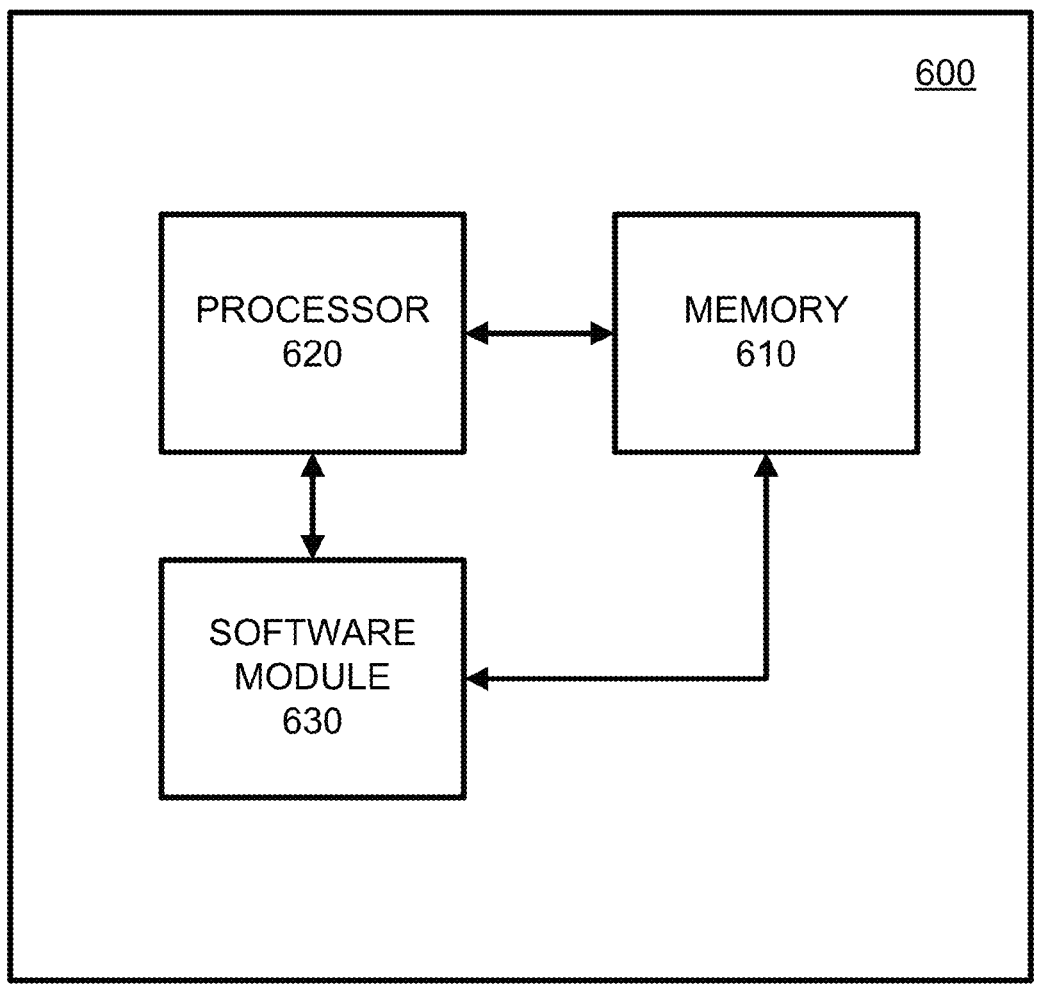
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Figure 7:
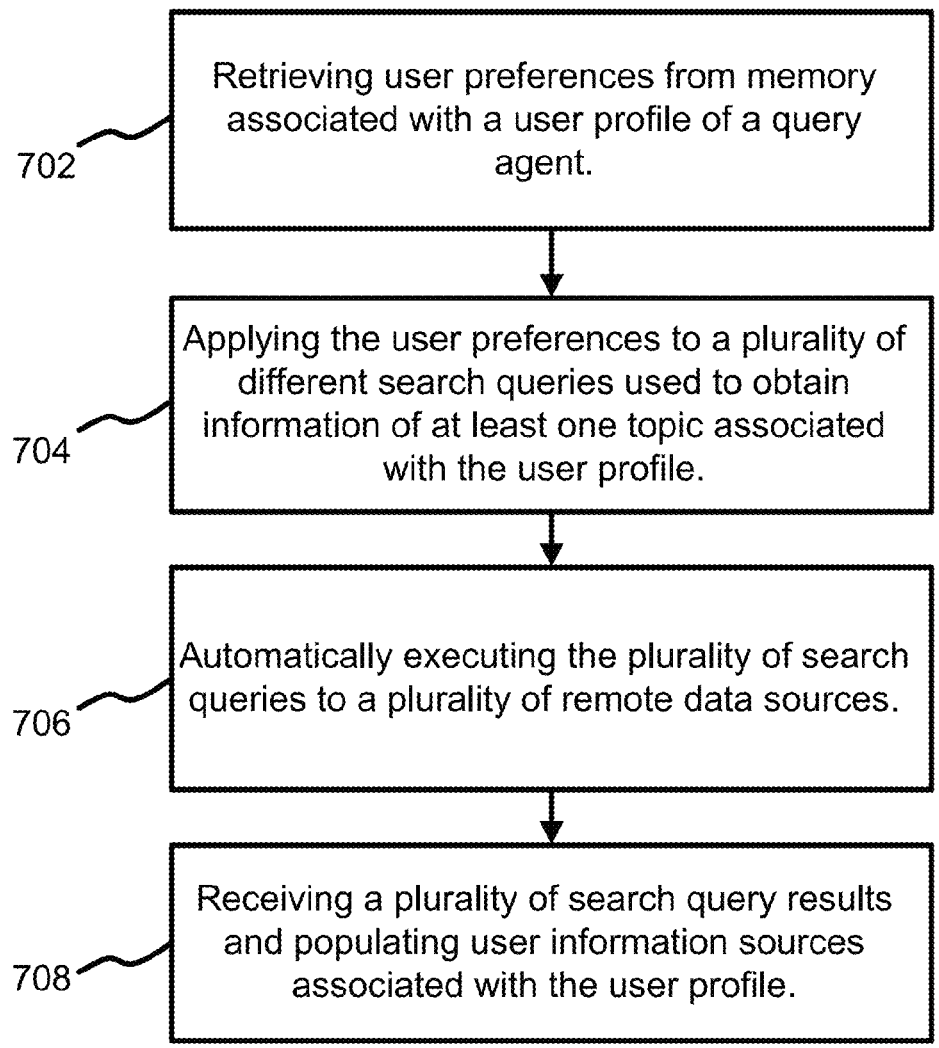
FIG. 7 illustrates a flow diagram of an example method according to an example embodiment of the present application.

One example method of operation is illustrated in FIG. 7. Referring to FIG. 7, the method 700 may include retrieving user preferences from memory associated with a user profile of a query agent at operation 702, applying the user preferences to a plurality of different search queries used to obtain information of at least one topic associated with the user profile, at operation 704, automatically executing the plurality of search queries to a plurality of remote data sources, at operation 706 and receiving a plurality of search query results and populating user information sources associated with the user profile at operation 708.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 5 can be performed by one or more of the modules or components described herein or in a distributed architecture and may include a transmitter, a receiver or a pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
retrieving user preferences from memory associated with a user profile of a query agent;
applying the user preferences to a plurality of different search queries used to obtain information of at least one topic associated with the user profile;
creating a primary health concern based on previously submitted search queries conducted under the user profile by identifying at least one health concern search term searched frequently from previously submitted search queries;
pairing at least one user demographic information stored in the user profile with demographic information of another user profile;
linking the user profile with the another user profile;
modifying the plurality of different search queries associated with the user profile to include content associated with queries and user profile related information of the another user profile and to include the primary health concern;
automatically executing the plurality of different search queries to a plurality of remote data sources periodically over a fixed period of time;
receiving a plurality of search query results and populating user information sources of a user interface associated with the user profile to include the at least one topic associated with the user profile and the another user profile;
parsing the previously submitted search queries which were performed at a time prior to a current search effort to identify search terms related to health conditions;
automatically executing the plurality of different search queries to the plurality of remote data sources based on the identified search terms from the previously submitted search queries; and
automatically subscribing the user profile to at least one source of information related to subject content of the identified search terms.

2. The method of claim 1, further comprising:
periodically re-executing the plurality of different search queries; and
automatically re-populating the user information sources which comprises:
retrieving uniform resource locator (URL) links to relevant web pages based on the user profile and populating a first window of the user interface with the URL links,
retrieving videos links to various video sources based on the user profile and populating a second window of the user interface with the video links, and
retrieving customized user content identified in the user profile and populating a third window with the customized user content comprising at least one of an interactive user blog, a publication audit filter that is updated when new publications become accessible at a predefined publication source via online content access, and a specific URL audit filter that is updated when new content at the URL links becomes accessible via online content access.

3. The method of claim 1, further comprising:
updating the user profile to include at least one additional user search preference based on previously submitted search queries submitted while logged into the user profile.

4. The method of claim 1, wherein the at least one source of information comprises at least one of an online news feed and a blog related to the subject content of the identified search terms.

5. The method of claim 1, wherein the user profile comprises user information posts to online data sources, user preferences, user demographic information, user health concerns, user health conditions.

6. An apparatus comprising:
a memory configured to store a user profile comprising a plurality of user preferences accessible via a query agent;
a processor configured to
retrieve user preferences from the memory associated with the user profile of the query agent,
apply the user preferences to a plurality of different search queries used to obtain information of at least one topic associated with the user profile,
create a primary health concern based on previously submitted search queries conducted under the user profile by identifying at least one health concern search term searched frequently from previously submitted search queries,
pair at least one user demographic information stored in the user profile with demographic information of another user profile,
link the user profile with the another user profile,
modify the plurality of different search queries associated with the user profile to include content associated with queries and user profile related information of the another user profile and to include the primary health concern,
automatically execute the plurality of different search queries to a plurality of remote data sources periodically over a fixed period of time,
parse the previously submitted search queries which were performed at a time prior to a current search effort to identify search terms related to health conditions,
automatically execute the plurality of different search queries to the plurality of remote data sources based on the identified search terms from the previously submitted search queries, and
automatically subscribe the user profile to at least one source of information related to subject content of the identified search terms; and
a receiver configured to receive a plurality of search query results and populate user information sources of a user interface associated with the user profile to include the at least one topic associated with the user profile and the another user profile.

7. The apparatus of claim 6, wherein the processor is further configured to periodically re-execute the plurality of different search queries, and automatically re-populate the user information sources which comprises the processor being further configured to
retrieve uniform resource locator (URL) links to relevant web pages based on the user profile and populating a first window of the user interface with the URL links,
retrieve video links to various video sources based on the user profile and populating a second window of the user interface with the video links, and
retrieve customized user content identified in the user profile and populating a third window with the customized user content comprising at least one of an interactive user blog, a publication audit filter that is updated when new publications become accessible at a predefined publication source via online content access, and a specific URL audit filter that is updated when new content at the URL links becomes accessible via online content access.

8. The apparatus of claim 6, wherein the processor is further configured to update the user profile to include at least one additional user search preference based on previously submitted search queries submitted while logged into the user profile.

9. The apparatus of claim 6, wherein the at least one source of information comprises at least one of an online news feed and a blog related to the subject content of the identified search terms.

10. The apparatus of claim 6, wherein the user profile comprises user information posts to online data sources, user preferences, user demographic information, user health concerns, user health conditions.

11. A non-transitory computer readable storage medium configured to store instructions that when executed cause a processor to perform:
retrieving user preferences from memory associated with a user profile of a query agent;
applying the user preferences to a plurality of different search queries used to obtain information of at least one topic associated with the user profile;
creating a primary health concern based on previously submitted search queries conducted under the user profile by identifying at least one health concern search term searched frequently from previously submitted search queries;
pairing at least one user demographic information stored in the user profile with demographic information of another user profile;
linking the user profile with the another user profile;
modifying the plurality of different search queries associated with the user profile to include content associated with queries and user profile related information of the another user profile and to include the primary health concern;
automatically executing the plurality of different search queries to a plurality of remote data sources;
receiving a plurality of search query results and populating user information sources of a user interface associated with the user profile to include the at least one topic associated with the user profile and the another user profile;
parsing previously submitted search queries which were performed at a time prior to a current search effort to identify search terms related to health conditions;
automatically executing the plurality of different search queries to the plurality of remote data sources based on the identified search terms from the previously submitted search queries; and
automatically subscribing the user profile to at least one source of information related to subject content of the identified search terms.

12. The non-transitory computer readable storage medium of claim 11, wherein the processor is further configured to perform:

periodically re-executing the plurality of different search queries; and automatically re-populating the user information sources which comprises retrieving uniform resource locator (URL) links to relevant web pages based on the user profile and populating a first window of the user interface with the URL links, retrieving video links to various video sources based on the user profile and populating a second window of the user interface with the video links, and retrieving customized user content identified in the user profile and populating a third window with the customized user content comprising at least one of an interactive user blog, a publication audit filter that is updated when new publications become accessible at a predefined publication source via online content access, and a specific URL audit filter that is updated when new content at a specific URL becomes accessible via online content access.

13. The non-transitory computer readable storage medium of claim 11, wherein the processor is further configured to perform:

updating the user profile to include at least one additional user search preference based on previously submitted search queries submitted while logged into the user profile.

14. The non-transitory computer readable storage medium of claim 11, wherein the at least one source of information comprises at least one of an online news feed and a blog related to the subject content of the identified search terms.

15. The non-transitory computer readable storage medium of claim 11, wherein the user profile comprises user information posts to online data sources, user preferences, user demographic information, user health concerns, user health conditions, and the processor is further configured to perform:

pairing at least one user demographic information with demographic information of another user profile;

linking the user profile with the another user profile; and modifying subsequent query results provided to the user to include content associated with at least one of queries, blog posts, and user profile related information of another user.

* * * * *